United States Patent
Shintani et al.

(10) Patent No.: US 6,882,096 B2
(45) Date of Patent: Apr. 19, 2005

(54) ACTIVE LANDING CONTROL SYSTEM FOR RASTER BASED DEVICES

(75) Inventors: Peter Rae Shintani, San Diego, CA (US); Ban Kawamura, San Diego, CA (US); Eiji Kono, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 25 days.

(21) Appl. No.: 10/616,669

(22) Filed: Jul. 10, 2003

(65) Prior Publication Data

US 2005/0007040 A1 Jan. 13, 2005

(51) Int. Cl.[7] .............................................. H01J 29/38
(52) U.S. Cl. ...................... 313/414; 313/413; 315/382; 315/399
(58) Field of Search ................. 315/15, 382, 339; 313/412, 413, 414, 421, 428

(56) References Cited

U.S. PATENT DOCUMENTS

| | | | | |
|---|---|---|---|---|
| 4,183,064 A | | 1/1980 | Sahara et al. ................. | 358/242 |
| 4,287,531 A | | 9/1981 | Mitamura et al. ............. | 358/67 |
| 4,314,179 A | | 2/1982 | Tooyama et al. .............. | 315/12 |
| 4,409,523 A | | 10/1983 | Yasumura ...................... | 315/371 |
| 4,636,843 A | | 1/1987 | Hosono et al. ................. | 358/67 |
| 5,223,769 A | | 6/1993 | Priere et al. ................... | 315/370 |
| 5,367,380 A | | 11/1994 | Hirano .......................... | 348/626 |
| 5,592,045 A | | 1/1997 | Dossot et al. ................. | 313/440 |
| 5,592,230 A | | 1/1997 | Yoshino ........................ | 348/448 |
| 5,621,287 A | * | 4/1997 | Dossot et al. ................. | 315/399 |
| 5,825,414 A | * | 10/1998 | Webb et al. ................... | 348/180 |
| 6,133,685 A | | 10/2000 | Konda et al. ................. | 313/456 |
| 6,288,481 B1 | * | 9/2001 | Inkyu et al. ................... | 313/413 |
| 6,356,011 B1 | * | 3/2002 | Park ............................. | 313/414 |
| 6,686,707 B1 | * | 2/2004 | Webb ............................ | 315/364 |
| 2002/0109452 A1 | | 8/2002 | Hwang et al. ................ | 313/414 |
| 2002/0171351 A1 | | 11/2002 | Park et al. .................... | 313/414 |

FOREIGN PATENT DOCUMENTS

| | | | |
|---|---|---|---|
| EP | 0 598 439 A2 | 11/1993 | ............ H04N/3/32 |
| EP | 1 056 276 A1 | 11/2000 | ............ H04N/3/32 |
| EP | 1 056 278 A1 | 11/2000 | ............ H04N/3/32 |
| JP | 56078276 A | 6/1981 | ............ H04N/3/08 |
| JP | 61099487 A | 5/1986 | ............ H04N/9/28 |
| JP | 03076380 A | 4/1991 | ............ H04N/3/16 |

* cited by examiner

*Primary Examiner*—Tuyet Vo
*Assistant Examiner*—Jimmy Vu
(74) *Attorney, Agent, or Firm*—John L. Rogitz

(57) ABSTRACT

Correction of electron beam landing misalignment in a raster-type display is undertaken without using the usual set of coils, but rather by superimposing a landing misalignment correction signal on the already-existing velocity modulation (VM) coil or on another coil located at the junction of the electron beams in the neck of the display. The correction signal may be varied based on pressure, temperature, and ambient magnetic field as indicated by respective sensors to appropriately correct electron beam landing on phosphors the positions of which may be affected by variations in magnetic fields, temperature, and pressure.

21 Claims, 3 Drawing Sheets

HORIZONTAL DIMENSION
LANDING ERROR CORRECTION
SIGNAL (ALTITUDE)

VERTICAL DIMENSION LANDING
ERROR CORRECTION SIGNAL
AMPLITUDE ENVELOPE (ALTITUDE)

COMBINED

TEMPERATURE CORRECTION ONLY

PROCESSOR CORRECTION ONLY

Sawtooth

US 6,882,096 B2

ACTIVE LANDING CONTROL SYSTEM FOR RASTER BASED DEVICES

I. FIELD OF THE INVENTION

The present invention relates to raster-based display devices such as televisions.

II. BACKGROUND OF THE INVENTION

In a raster-based devices such as a television cathode ray tube, the electron beam that excites the colored display phosphors (by "landing" on them) must be precisely directed, since the phosphors are small, particularly in higher resolution devices. Because of variations in the Earth's magnetic field, the orientation of the TV relative to the Earth's field, etc., it can be necessary to correct the beam to land on the center of the intended phosphor during the raster sweep, because variations in the ambient magnetic field can cause the beams to move a small amount from their intended direction. Moreover, beam alignment errors can also be caused by pressure changes such as might be caused by altitude change and also by temperature variations, making it necessary to correct for landing misalignment to account for such pressure- and temperature-based misalignment. When the beams are near the edges of the display they do not misalign much, and when directed near the center of the display do not typically misalign in the plane of the raster sweep, consequently requiring minimal correction in case of altitude-based misalignment. For beam locations not in these areas, however, correction may be necessary. This correction currently is achieved by appropriately establishing the biasing current of several landing correction coils (usually five) inside the display but outside the tube portion of the display, usually located near the corners of the display and also around the perimeter of the tube.

The present invention recognizes that the above-mentioned correction coils can correct beam direction in the corners of the display, where the coils are located, but are less effective in correcting beam direction in locations away from the display corners. The present invention further recognizes that on the neck of many raster-based displays, a so-called velocity modulation (VM) coil is disposed to modulate the horizontal scanning speed of the electron beam. That is, in the neck of the display one or more junctions of the red, green, and blue beams of the display exists, and it is at one of these junctions (the only junction in some cases, e.g., a Sony Trinitron® TV) that the VM coil is located. The present invention further recognizes that in addition to its conventional function, this already existing coil or another coil can be used to correct for landing misalignment.

SUMMARY OF THE INVENTION

A raster-type display includes a coil, potentially the pre-existing velocity modulation (VM) coil, that is preferably disposed at a location of the display wherein three electron beams for respectively activating red, green, and blue display elements (such as phosphors) converge. A current source is coupled to the coil, and the current source outputs a landing misalignment correction signal to the coil. One or more sensors generate a control signal. The control signal is sent to the current source to establish the landing misalignment correction signal, which is representative of at least one of: temperature, ambient magnetic field, and pressure. The coil, if it is the VM coil, also carries an edge enhancement signal.

In a preferred embodiment, the display contains no other landing correction coils apart from the VM coil. The exemplary non-limiting current source may receive a vertical position signal for establishing an amplitude of the landing misalignment signal based on a vertical position of an electron beam of the display.

The control signal from the sensor may be a DC signal. The current source may include a switch that receives the control signal and that converts the control signal to the time varying landing misalignment correction signal. The non-limiting switch can receive a time varying signal from a horizontal drive circuit of the display. When the sensor is a pressure sensor, the time varying signal may be a sinusoid. To add corrections for temperature, the amplitude of the signal may be further varied according to a signal from a temperature sensor. To add corrections for magnetic field effects, the sinusoid can be ramped in an appropriate direction as indicated by a signal from a magnetic sensor.

In another aspect, a method for correcting for electron beam landing misalignment in a raster-type display includes applying an alignment correction signal to a coil preferably disposed at a junction of three display beams in, e.g., Sony Trinitron® TVs or other one-gun TVs. The alignment correction signal is established to correct for landing offset of the beams caused by at least one of: temperature effects, magnetic field effects, and pressure effects. The method may further include applying a speed correction (edge enhancement) signal to the coil.

In still another aspect, a raster display includes single coil means for influencing at least scanning one electron beam for undertaking landing misalignment correction of the beam.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
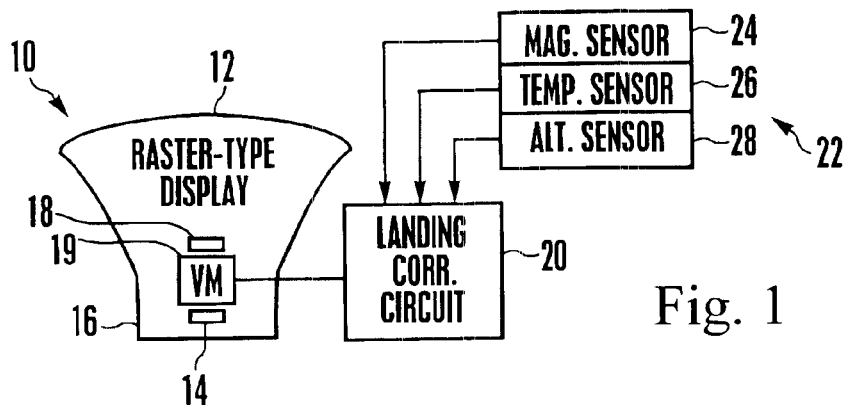
FIG. 1 is a schematic diagram showing a raster-type display with landing misalignment correction circuitry.

Referring initially to FIG. 1, a raster-type display such as but not limited to a cathode ray tube (CRT) for a television is shown, generally designated 10. As shown, the display 10 includes a screen 12 in front of an electron beam source 14 that scans one or more electron beams back and forth and up and down across the screen in accordance with raster scanning principles known in the art to activate red, green, and blue display elements in the screen 12. The electron beam source 14 can be located in a neck 16 of the display 10.

A landing correction coil 18 may also be located in the neck 16 preferably at a location of the display 10 wherein the three beams for activating red, green, and blue phosphors converge, e.g., at the so-called "G4" element of an electron gun-type of beam source where three beams (respectively for red, green, and blue screen element activation) converge. If desired the landing correction coil 18 may be located anywhere in the beam path. The display 10 may also include a velocity modulation (VM) coil 19 of the display. In accordance with the present invention, a landing correction coil 18 that is separate from the VM coil 19 may not be provided, with the below-described functions being undertaken by superimposing landing correction signals on the VM coil 19. In such a case, the VM coil 19 would be the landing correction coil. Or, the landing correction function of the present invention may be undertaken only by a landing correction coil 18 that is separate from the VM coil. Still again, some of the below-described landing correction signals may be carried by a landing correction coil 18 (e.g., correction signals to compensate for pressure and temperature changes), while other landing corrections (e.g., signals to compensate for magnetic field changes) may be carried by the VM coil 19 that, like the landing correction coil 18, is disposed at a convergence of the three electron beams. In any case, the VM coil 19 receives a speed correction signal in accordance with conventional raster display principles known in the art to modify the horizontal scanning speed of the beams to enhance edge details, potentially as well as the below-disclosed landing misalignment correction signal in accordance with present principles.

Accordingly, with the above in mind, while the discussion below focusses on the case wherein only the VM coil 19 is provided and, hence, establishes the landing correction coil of the present invention, it is to be understood that the principles herein apply equally to the above cases wherein a separate landing correction coil 18 located anywhere but preferably at a convergence of the three electron beams undertakes some or all of the below-described landing correction functions.

With more particularity, a landing correction circuit 20 sends a landing misalignment correction signal to the VM coil 19, with the landing correction signal being superimposed on the convention speed correction signal when the VM coil of the display is used. The landing misalignment correction signal is based on control signals that are input to the landing correction circuit 20 from one or more sensors 22. In the embodiment shown, the sensors may include a magnetic field sensor 24 for sensing the ambient magnetic field around the display 10, a temperature sensor 26 for sensing the temperature within the display 10, and a pressure sensor 28 for sensing the pressure inside of the display 10. The control signals from the sensors 24, 26, 28 may be added together or processed separately. The circuit of FIG. 2 is particularly useful for pressure-only compensation.

Figure 2:
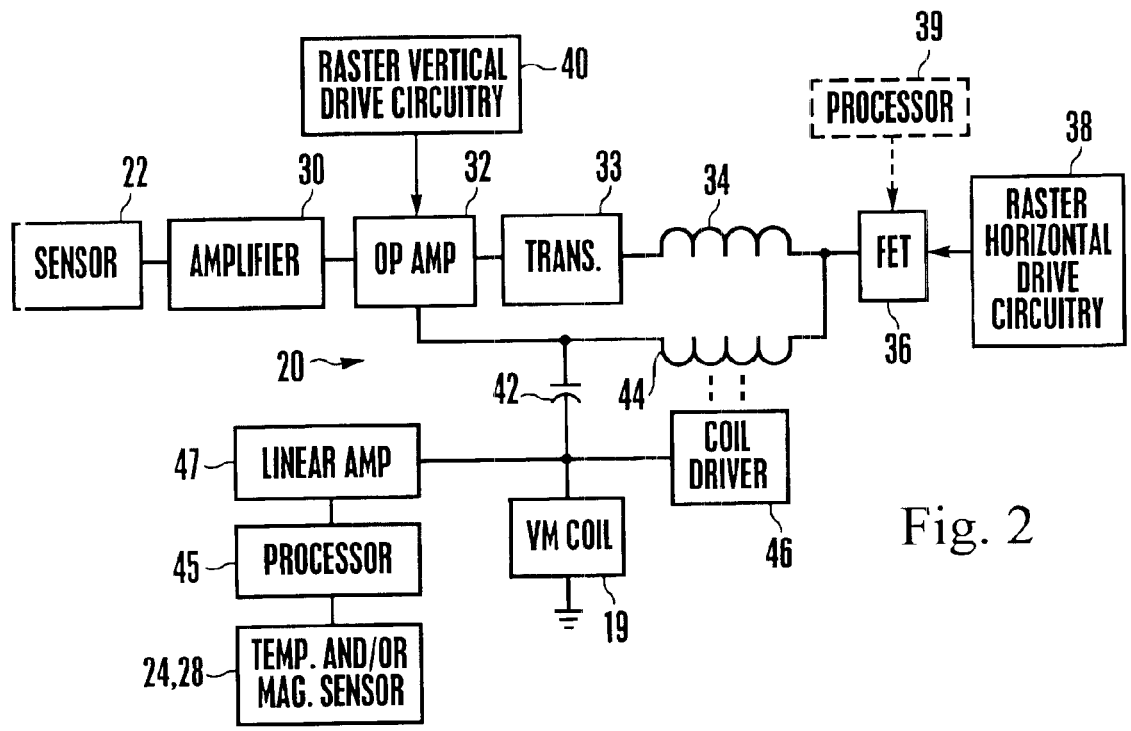
FIG. 2 is a block diagram of an exemplary landing misalignment correction circuitry.

The details of a preferred non-limiting embodiment of the landing correction circuit 20 can be seen in FIG. 2, a direct current (DC) signal from one or more sensors 22 (e.g., from the pressure sensor 28 and/or temperature sensor 26) is amplified by an amplifier 30 and sent to an operational amplifier 32. When both the temperature sensor 26 and pressure sensor 28 are used, their DC signals can be combined to produce a single DC signal that is used to establish the amplitude of the below-discussed waveform.

In turn, the signal may be passed to a transistor 33 or field effect transistor and thence through a choke inductor 34 for input to a field effect transistor (FET) 36. In some cases the FET 36 may be omitted. The FET 36 may receive a shaping signal from the horizontal raster drive circuitry 38 of the display 10, particularly for sinusoidal signals intended to correct for pressure. For purposes to be shortly disclosed the opamp 32 may receive a signal from the raster vertical drive circuitry 40 of the display 10.

While for illustration the disclosure below discusses sinusoidal landing correction signal waveforms, it is to be understood that the geometry of the display 10 and other physical characteristics of the display 10 will dictate the exact waveform used, based on, e.g., empirical observation.

Particularly for applications wherein the landing correction signal is intended to be sinusoidal to correct for pressure-induced misalignment, for efficiency the signal next can be sent through a resonant circuit that includes a resonance capacitor 42 and a resonance inductor 44, the values for which are established based on the particular geometry of the display 10. A VM coil driver 46 can be provided in accordance with coil principles known in the art to drive the VM coil 19. The resonant portion of the circuit 20 shown in FIG. 2 is an exemplary circuit that is particularly suited for processing signals from a pressure sensor.

For correction of temperature-induced and/or ambient magnetic field-induced variances in addition to or in lieu of pressure-induced variance correction, a linear circuit can be used so that in addition to (or in lieu of) the sinusoidal pressure-based correction signal, DC components can also be applied to the coil. Such a linear circuit can include a processor 45 that accesses an empirically determined lookup table of temperature/pressure/magnetic field signals versus landing misalignment correction signals and that controls a linear amplifier 47 to directly drive the coil.

Figure 3:
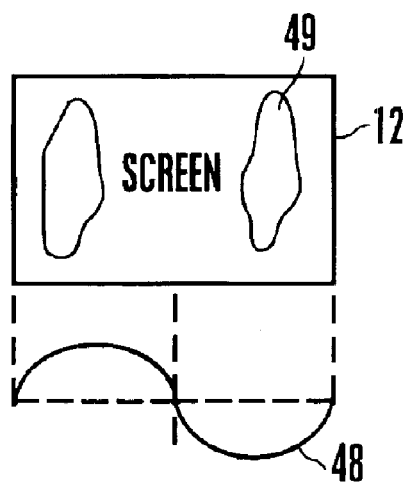
FIG. 3 is a schematic diagram showing the landing misalignment correction signal in the horizontal dimension for pressure variances in relation to the display screen.
Figure 4:
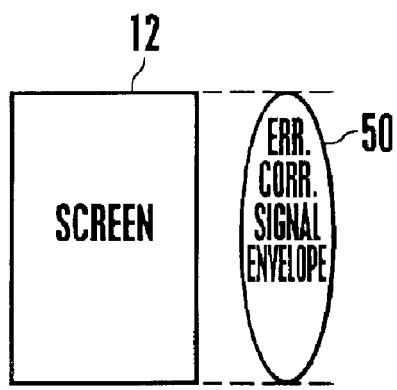
FIG. 4 is a schematic diagram showing the amplitude envelope for the landing misalignment correction signal in the vertical dimension for pressure variances in relation to the display screen.

FIGS. 3 and 4 show how the landing misalignment correction signal varies in the horizontal (FIG. 3) and vertical (FIG. 4) dimensions defined by the screen 12 based on a signal from the pressure sensor 28, it being understood that the preferred non-limiting pressure sensor 28 outputs a progressively larger DC signal, e.g., the higher in altitude the display 10 is.

As shown, the landing correction signal 48 has zero crossings at the left and right sides of the screen 12 and in the middle of the screen 12. This is because the beams, when near the edges of the screen, do not misalign much under pressure variations, whereas for positions in the middle of the screen the beams do not misalign much in the plane of the screen 12. Accordingly, at these locations there is little need for a landing correction signal for pressure variances. On the other hand, in regions 49 of the screen 12 that are not near the edges or center of the screen, the electron beams misalign in the plane of the screen 12 when pressure is varied, thus requiring the electron beam(s) to be landing-corrected.

With this in mind, as shown by the parabolic-shaped landing correction signal amplitude envelope 50 in FIG. 4, while the peak amplitude of the landing correction signal does not change for any given horizontal scan line but rather remains (at least for pressure correction as may be necessitated by, e.g., altitude changes) constant for the scan line, the peak amplitude is smaller for horizontal scans near the top and bottom edges of the screen 12, becoming progressively larger for scans near the center of the screen 12. To achieve this parabolic envelope, the signal from the vertical drive circuitry 40 that is applied to the opamp 32 can be appropriately smaller near the top and bottom edges than in the middle of the screen.

Figure 5:
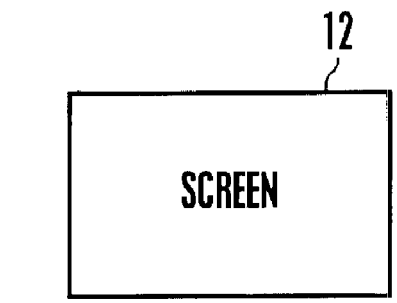
FIG. 5 is a schematic diagram showing the landing misalignment correction signal in the horizontal dimension for temperature variances in relation to the display screen.

FIG. 5 shows that the principles above can be applied to correct for temperature-induced variances by generating a DC ramp that is applied to the sinusoid described above for pressure corrections. Specifically, using the signal from the temperature sensor 26, a DC bias voltage 52 can be applied to the pressure-correcting sinusoid 54 to achieve the combined ramped signal 56 shown in FIG. 5 in either the vertical and/or horizontal dimensions. As discussed above, a linear amplifier can be used to provide the necessary waveforms in this instance.

Figure 6:
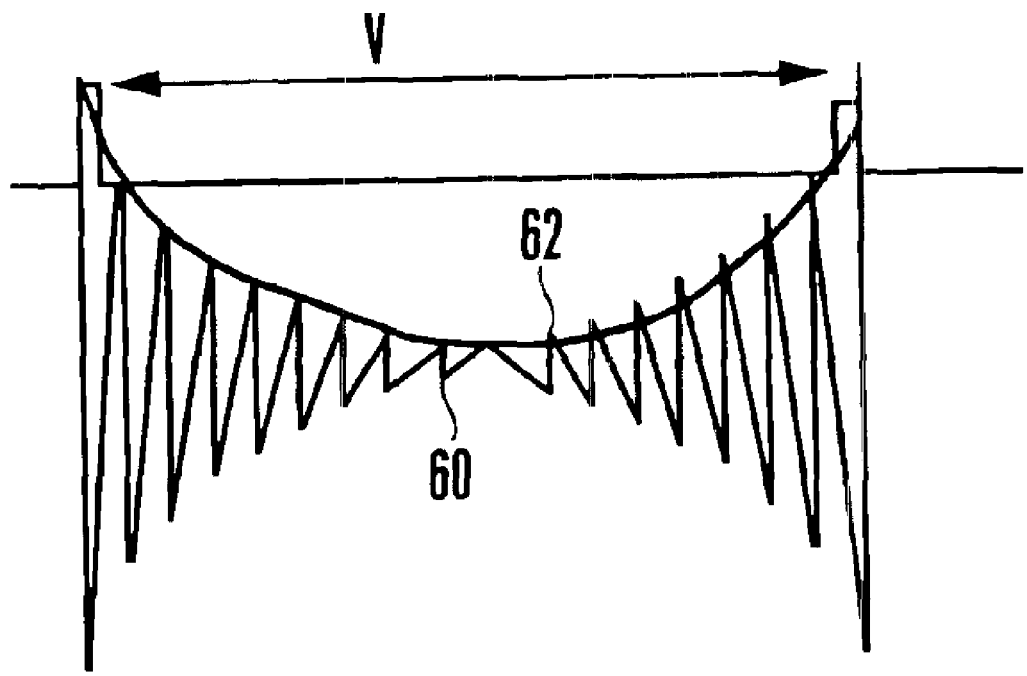
FIG. 6 is a schematic diagram showing the landing misalignment correction signal for magnetic field variances.

FIG. 6 shows another type of ramp signal that can be added, if desired, to the temperature-correcting DC ramp of FIG. 5 and either with that signal or by itself be superimposed on the pressure-correcting sinusoidal signal in accordance with principles set forth above. As shown, in the horizontal dimension a ramped sawtooth signal 60 varies with higher amplitudes near the edges of the display and lower amplitudes near the center. The horizontal ramp signal 60 is also modulated at the vertical refresh rate to remain in an envelope defined by a parabola 62 over the vertical period "V", again with higher amplitudes near the top and bottom edges and lower amplitudes near the display center.

In addition to dispensing with the conventional corner-mounted correction coils, the present invention, by more precisely correcting for electron beam misalignments, may also permit omitting the null portions between phosphors currently established in raster displays to shield phosphors from misaligned beams, resulting in brighter displays.

While the particular ACTIVE LANDING CONTROL SYSTEM FOR RASTER BASED DEVICES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A raster-type display, comprising:
   a landing correction coil;
   a current source coupled to the landing correction coil and outputting a landing misalignment correction signal thereto; and
   a least one sensor generating a control signal, the control signal being sent to the current source to establish the landing misalignment correction signal at least partially based thereon, wherein the sensor is at least one of: a temperature sensor, and a magnetic sensor, and the landing misalignment correction signal is a ramp signal.

2. The display of claim 1, wherein the landing correction coil is disposed at a location of the display wherein electron beams for respective activation of red, green, and blue display elements converge.

3. The display of claim 2, wherein the display contains no other landing correction coils apart from the landing correction coil, the landing correction coil also carrying a speed correction signal.

4. The display of claim 2, wherein the current source receives a position signal for establishing an amplitude of the landing misalignment signal at least partially based on a position of an electron beam of the display.

5. The display of claim 4, wherein the control signal is a DC signal.

6. The display of claim 5, wherein the current source comprises a member receiving the control signal and converting the control signal to the time varying landing misalignment correction signal.

7. The display of claim 6, wherein the member receives a time varying signal from a horizontal drive circuit of the display.

8. The display of claim 2, further comprising a velocity modulation (VM) coil.

9. The display of claim 8, wherein the VM coil and the landing correction coil both receive signals for correcting for electron beam misalignment.

10. A method for correcting for electron beam landing misalignment in a raster-type display, comprising:
    applying an alignment correction signal to a coil located at a convergence of three beams of the display, the alignment correction signal being established to correct for landing offset of the beams caused by pressure effects, wherein the alignment correction signal being a sinusoid.

11. The method of claim 10, wherein the coil is a VM coil carrying a speed correction signal.

12. The method of claim 10, comprising providing:
    a current source coupled to the coil and outputting a landing misalignment correction signal thereto; and
    at least one sensor generating a control signal, the control signal being sent to the current source to establish the landing misalignment correction signal based at least partially thereon.

13. The method of claim 10, wherein the display includes a velocity modulation (VM) coil and the method includes applying signals for correcting for electron beam misalignment to the VM coil and the landing correction coil.

14. The method of claim 10, comprising applying a vertical position signal for establishing an amplitude of the landing misalignment signal at least partially based on a vertical position of an electron beam of the display.

15. The method of claim 14, wherein the control signal is a DC signal and the current source comprises a switch receiving the control signal and converting the control signal to the time varying landing misalignment correction signal.

16. A raster display, comprising:
    single coil means for influencing at least scanning one electron beam for undertaking landing misalignment correction of the beam;
    a current source means coupled to the single coil means for outputting a landing misalignment correction signal thereto; and at least one sensing means for generating a control signal, the control signal being sent to the current source means to establish the landing misalignment correction signal at least partially based thereon, the signal being representative of at least one of: temperature, ambient magnetic field, in which case the correction signal is a ramp signal, or pressure, in which case the correction signal is a sinusoid.

17. The display of claim 16, wherein the current source means receives a vertical position signal for establishing an amplitude of the landing misalignment signal at least partially based on a vertical position of the scanning electron beam.

18. The display of claim 16, wherein the control signal is a DC signal.

19. The display of claim 18, wherein the current source means comprises switch means for receiving the control signal and converting the control signal to the landing misalignment correction signal.

20. The display of claim 16, wherein the switch means receives a time varying signal from a horizontal drive circuit.

21. The display of claim 16, the single coil means also carrying a speed correction signal.

* * * * *